United States Patent
Sellers

(10) Patent No.: US 6,187,829 B1
(45) Date of Patent: Feb. 13, 2001

(54) HEAT GELLABLE LATEX COMPOSITION AND METHOD OF MAKING SAME

(75) Inventor: Alan P. Sellers, Dalton, GA (US)

(73) Assignee: Textile Rubber & Chemical Company, Inc., Dalton, GA (US)

( * ) Notice: Under 35 U.S.C. 154(b), the term of this patent shall be extended for 0 days.

(21) Appl. No.: 09/482,190

(22) Filed: Jan. 12, 2000

Related U.S. Application Data

(63) Continuation of application No. 09/349,812, filed on Jul. 9, 1999, now abandoned.

(51) Int. Cl.$^7$ .................................................... C08J 9/30
(52) U.S. Cl. .............................................. 521/71; 521/65
(58) Field of Search ........................................ 521/65, 71

(56) References Cited

U.S. PATENT DOCUMENTS

| | | | | |
|---|---|---|---|---|
| 2,845,659 | * | 8/1958 | Calvert | 521/71 |
| 3,732,578 | * | 5/1973 | Pollack | 521/65 |
| 3,737,488 | * | 6/1973 | Porter | 521/71 |
| 3,969,289 | * | 7/1976 | Coffin et al. | 521/71 |
| 4,172,067 | * | 10/1979 | Benton | 521/65 |
| 4,214,053 | * | 7/1980 | Porter | 521/65 |
| 4,722,945 | * | 2/1988 | Wood | 521/65 |
| 4,725,627 | * | 2/1988 | Arnason et al. | 521/65 |
| 4,781,781 | * | 11/1988 | Hallworth et al. | 521/65 |

OTHER PUBLICATIONS

Royce J. Noble, Ph.D., "Latex in Industry," 1953, pp. 233–235; 352; 355–359; 369; 374; 485–486.

* cited by examiner

*Primary Examiner*—Morton Foelak
(74) *Attorney, Agent, or Firm*—Kilpatrick Stockton LLP

(57) ABSTRACT

There is disclosed a heat-gellable latex composition. The composition comprises a curable natural or synthetic elastomeric latex, an amount of a curing agent sufficient to cure the latex, an amount of ammonia sufficient to prevent gellation of the latex, an amount of a gelling agent sufficient to gel the latex, the gelling agent comprising the reaction product of zinc chloride and an ammonium-containing compound, and an amount of an accelerator sufficient to accelerate vulcanization of the latex, the accelerator comprising a zinc dithiocarbamate. A method for heat-gelling a latex composition is also disclosed.

13 Claims, No Drawings

HEAT GELLABLE LATEX COMPOSITION AND METHOD OF MAKING SAME

This is a continuation of prior application Ser. No. 09/349,812, filed Jul. 9, 1999 now abandoned.

FIELD OF INVENTION

The present invention relates generally to curable latex compositions, and, more specifically, to heat-gellable latex compositions that are stable in the absence of heat for a relatively long period of time.

BACKGROUND OF THE INVENTION

Natural and synthetic rubbery cellular products have many applications. One significant use for such products is the application of a layer of foam to carpet backing to provide an integral cushion. Synthetic latex foam is now used widely in the textile industry.

It is customary in compounding latex dispersions to add all the compounding ingredients except the activator prior to the foaming step. A commonly used activator is zinc oxide. However, if this procedure is followed, the zinc oxide present would induce premature coagulation during the foaming step. Therefore, zinc oxide is frequently added prior to the foaming step.

U.S. Pat. No. 3,969,289 discloses a one-part storable foamable latex composition. The composition comprises a natural or synthetic elastomeric latex that is subject to cure. A curing system is provided comprising an ammonia-retarded dibenzyl dithiocarbamate accelerating agent that is inhibited in accelerating function in the presence of a base, such as ammonia. The composition includes an amount of ammonia sufficient to inhibit the cure of the latex and a foaming agent. Most importantly, the composition includes a siloxane heat-sensitizing agent to lower the coagulation temperature of the latex to about 90 degrees F., or above. The latex composition disclosed in the '289 patent is disadvantageous because it requires the use of a specific heat sensitizing agent.

Thus, a one-part foamable latex composition that is stable against gellation for extended periods of time prior to or after foaming has long been sought in the art.

SUMMARY OF THE INVENTION

The present invention satisfies the above-described needs by providing an improved storage stable, embossable, one-part, foamable latex composition. The improved latex composition of the present invention comprise a vulcanizable latex rubber dispersion, an amount of a vulcanizing agent sufficient to vulcanize the latex rubber, an amount of ammonia sufficient to prevent gellation of the latex rubber, an amount of a gelling agent sufficient to gel the latex rubber, the gelling agent comprising the reaction product of zinc chloride and an ammonium-containing compound, and an amount of an accelerator sufficient to accelerate vulcanization of the latex rubber, the accelerator comprising zinc dithiocarbamate.

In an alternate embodiment, the present invention comprises a one-part foamable latex composition which may be stored for extended periods of time prior to foaming without deterioration of physical properties. The composition comprises a natural or synthetic elastomeric latex subject to cure. A curing system is provided which comprises an ammonia-retarded dithiocarbamate accelerating agent, which agent is inhibited in accelerating function in the presence of ammonia. Ammonia is provided in an amount sufficient to inhibit the cure of the latex. A gelling agent comprising zinc ammonium chloride is present in an amount sufficient to gell the latex upon removal of a sufficient amount of ammonia from the composition. And, a frothing agent is provided in an amount sufficient to permit mechanical frothing of the composition into a foam.

The present invention also comprises a method comprising heating a composition for a time sufficient to cause gellation. The composition comprises a natural and/or synthetic elastomeric latex subject to cure. A curing system is provided which comprises an ammonia-retarded dithiocarbamate accelerating agent, which agent is inhibited in accelerating function in the presence of ammonia. Ammonia is provided in an amount sufficient to inhibit the cure of the latex. A gelling agent comprising zinc ammonium chloride is present in an amount sufficient to gell the latex upon removal of a sufficient amount of ammonia from the composition. And, a frothing agent is provided in an amount sufficient to permit mechanical frothing of the composition into a foam.

In an alternate embodiment, the present invention comprises a method of forming an embossed latex foam product comprising forming a foam by mechanically frothing a composition comprising a natural or synthetic elastomeric latex subject to cure. A curing system is provided which comprises an ammonia-retarded dithiocarbamate accelerating agent, which agent is inhibited in accelerating function in the presence of ammonia. Ammonia is provided in an amount sufficient to inhibit the cure of the latex. A gelling agent comprising zinc ammonium chloride is present in an amount sufficient to gell the latex upon removal of a sufficient amount of ammonia from the composition. And, a frothing agent is provided in an amount sufficient to permit mechanical frothing of the composition into a foam. The frothed composition is then formed into a layer. The layer is heated for a time sufficient to cause coagulation of the latex. Then, the layer is embossed after it has coagulated, but before it has cured.

Accordingly, it is an object of the present invention to provide an improved foamable latex composition and an improved method for forming a foamed latex composition.

Another object of the present invention is to provide an improved one-part foamable latex composition that may be stored for extended periods of time prior to foaming without deterioration of physical properties.

A further object of the present invention is to provide an embossable latex foam composition and a method for embossing a latex foam composition.

These and other objects, features and advantages of the present invention will become apparent after a review of the following detailed description of the disclosed embodiments and the appended claims.

DETAILED DESCRIPTION OF THE DISCLOSED EMBODIMENTS

The present invention relates to a one-part foamable latex composition that can be stored for extended periods of time prior to foaming. The latex foam of the present invention is also heat-gellable and embossable. The latex compositions of the present invention may be used for the production of foam rubber-backed fabrics, particularly carpets, in addition to the manufacture of unattached foam rubber sheeting and molded foam articles.

The latex composition of the present invention comprises a natural or synthetic elastomeric latex dispersion that is subject to cure, a curing system which comprises a curing agent and an ammonia-retarded accelerating agent, ammonia, and a gelling agent comprising zinc ammonium chloride. The latex composition may also optionally include a frothing agent, fillers, pigments, antioxidants, thickeners, and the like.

The latex composition of the present invention comprises a natural or synthetic elastomeric latex dispersion that is subject to cure or vulcanization. The specific nature of the elastomeric latex is not critical to the present invention and all elastomeric polymers commercially available in latex form may be used. Examples of elastomeric latex dispersions that are useful in the present invention include acrylonitrile, chloroprene, isoprene, butadiene-styrene, butadiene-acrylonitrile, polyacrylonitrile, polyisoprene, polystyrene, polyvinylidene chloride, polyvinyl chloride, polyvinyl acetate, polymethyl methacrylate, co-polymers of the monomers of these resinous polymers and resinous copolymers of these monomers with other copolymerizable monomers, such as $C_4$–$C_{10}$ conjugated dienes. Other suitable latices are disclosed in U.S. Pat. Nos. 3,904,558; 3,969,289, 4,240,860; 4,888,134; 3,737,488 and 2,845,659, all of which are incorporated herein by reference. For best results, the starting latices should contain at least 15% by weight total solids before compounding; preferably, about 40%–75% by weight total solids.

The latex composition of the present invention also comprises a curing agent or vulcanizing agent. Many curing agents or vulcanizing agents for the elastomeric latices identified above are known to those skilled in the art and the particular curing or vulcanizing agent is not critical to the present invention. Curing or vulcanizing agents that may be used in the present invention include sulfur, sulfur donors, i.e., sulfads, TMTD, TETD to include thiazoles, i.e., ZMBT. The amount of curing or vulcanizing agent that may be used in the present invention is an amount sufficient to cure or vulcanize the latex; preferably, approximately 1–5 parts by weight per 100 parts by weight of uncompounded latex solids.

The latex composition of the present invention also comprises an ammonia-retarded accelerating agent that is inhibited in its accelerating function by the presence of ammonia or ammonia-containing compounds. The ammonia-retarded accelerating agent useful in the present invention includes metal salts of dibenzyl dithiocarbamate compounds, such as zinc dibenzyl dithiocarbamate and sodium dibenzyl dithiocarbamate and mixtures thereof. The amount of ammonia-retarded accelerating agent that may be used in the present invention is an amount sufficient to accelerate vulcanization of the latex in the absence of a sufficient amount of ammonia; preferably, approximately 0.5–5 parts by weight per 100 parts by weight of uncompounded latex solids.

The latex composition of the present invention also comprises ammonia or ammonia-containing compounds, such as ammonium hydroxide, in an amount sufficient to prevent the gellation of the latex composition. The amount of ammonia that must be present in the composition is an amount sufficient to prevent gellation of the latex or at least 0.3% by weight. The amount of ammonia that is preferred is approximately 0.3–5 parts by weight per 100 parts by weight of uncompounded latex solids.

The latex composition of the present invention also comprises a gelling agent. The gelling agent is the reaction product of zinc chloride and an ammonium compound selected from ammonium hydroxide. The resulting compound is zinc ammonium chloride which has the chemical formula $Zn(NH_4)_nCl_2$. The amount of gelling agent that may be used in the present invention an amount sufficient to gell the latex upon removal of a sufficient amount of ammonia; preferably, approximately 0.5–2 parts by weight per 100 parts by weight of uncompounded latex solids.

The present invention may optionally include an activator. The preferred activators are zinc oxide and magnesium oxide. The amount of activator that may be used in the present invention is approximately 0–5 parts by weight per 100 parts by weight of uncompounded latex solids.

The order of addition of the foregoing components of the latex composition of the present invention is not critical. However, it is preferred to first combine the latex, ammonia, gelling agent and optionally the fillers, surfactants, pigments, antioxidants, thickeners, dispersants and the like. These ingredients can be blended together in a conventional manner, such as using a Hobart mixer. A second blend of the accelerator, the curing agent and optionally the activator is prepared. Then, the first and second blends are combined and blended together to form the finished composition.

The following examples are illustrative of the present invention and are not intended to limit the scope of the invention as set forth in the appended claims. All temperatures are in degrees Celsius and all percentages are by weight unless specifically stated otherwise.

EXAMPLE 1

The following formulations shown in Table 1 below are prepared:

TABLE 1

| Ingredient | Formula 1 | Formula 2 | Formula 3 |
| --- | --- | --- | --- |
| Latex | 100 | 100 | 100 |
| Oleic acid (surfactant) | 1 | 2.5 | 5 |
| Antioxidant | 0.5 | 1 | 2 |
| Phosphate dispersant | 0 | 0.3 | 0.7 |
| Inert filler | 0 | 150 | 300 |
| Pigment (Titanium Dioxide) | 0 | 5 | 10 |
| Zinc oxide | 0.5 | 5 | 10 |
| Sulfur | 1 | 2.5 | 5 |
| Zinc dibenzyldithiocarbamate | 0.5 | 2.5 | 5 |
| Z(MBT) | 0.5 | 2.5 | 5 |
| Ammonia | 0.3 | 2.5 | 5 |
| Zinc ammonium chloride | 0.5 | 1.5 | 2 |
| Thickening agent | 0.1 | 2.5 | 5 |

In Table 1 above, the oleic acid surfactant is potassium oleate soap, the antioxidant is of a phenolic-type, the phosphate dispersant is tetrasodium pyrophosphate, tetrapotassium pyrophosphate or sodium hexametaphosphate, the filler is calcium carbonate, feldspar, aluminum trihydrate or Kaolin clay, ZMBT is zinc-2-mercaptobenzothiazole, the thickening agent is sodium polyacrylate, guar gums or alginates.

The latex, potassium oleate, antioxidant, phosphate dispersant inert filler, pigment, ammonia, zinc ammonium chloride and thickener are blended together in a Hobart mixer. The zinc oxide, sulfur, zinc dibenzyldithiocarbamate and Z(MBT) are blended together in a separate Hobart mixer. The two blends are then combined and thoroughly mixed in a Hobart mixer.

The resulting mixtures are stored in separate containers for a period of two months. The containers are opened and the contents are examined. There is no sign of coagulation of the latex in any of the formulations.

The resulting mixtures are also fed to an Oakes froth generator where they are converted to a froth having a density of approximately 4–40 pounds per cubic foot. The froth is then deposited from a traversing hose onto the backing of a carpet carried on a moving, continuous conveyor belt. The moving belt carries the carpet and the deposited froth under a doctor blade which doctors the deposited froth into a layer of approximately 0.062–0.500 inches in thickness. The belt carrying the carpet and the layer of frothed latex on the backing thereof passes into a forced hot air over at a temperature of approximately 130°–500° F. The frothed layer of latex is heated for a period of approximately 15 seconds to 2 minutes. The heating of the frothed layer of latex is sufficient to volatilize enough of the ammonia from the latex composition so that gellation or coagulation of the latex composition occurs. The carpet and layer of frothed latex then passes under an embossing roller which embosses a waffle pattern on the gelled, but not cured, layer of frothed latex foam. The carpet and embossed layer of foam then passes through a second heated forced air oven where the layer of foam is heated at a temperature of approximately 180°–400° F. for a period of approximately 1–12 minutes. When the carpet emerges from the second oven, the frothed foam is dried and cured or vulcanized and has an embossed pattern on its surface.

EXAMPLE 2

The following formulations shown in Table 2 below are prepared:

TABLE 2

| Ingredient | Formula 1 | Formula 2 |
| --- | --- | --- |
| Latex | 100 | 100 |
| Oleic acid (surfactant) | 5 | 5 |
| Antioxidant | 2 | 2 |
| Phosphate dispersant | 0.7 | 0.7 |
| Inert filler | 300 | 300 |
| Pigment | 10 | 10 |
| Zinc oxide | 0 | 5 |
| Sulfur | 5 | 5 |
| Zinc dibenzyldithiocarbamate | 5 | 5 |
| Z(MBT) | 5 | 5 |
| Ammonia | 5 | 5 |
| Zinc ammonium chloride | 2 | 0 |
| Thickening agent | 5 | 5 |

The ingredients were prepared in the same manner as described above in Example 1. It should be noted however that the two formulas are identical except that Formula 1 contains zinc ammonium chloride but no zinc oxide, and Formula 2 contains zinc oxide but no zinc ammonium chloride. The two formulas are foamed, placed on a carpet backing and heated in the same manner as described above in Example 1. When the carpet reaches the embossing roller, the foam from Formula 2 (i.e, no zinc ammonium chloride) is collapsed without any cell structure and the surface is blistered; however, the foam of Formula 1 (i.e, no zinc oxide) has maintained its original cellular structure and thickness and is in a suitable condition for embossing.

EXAMPLE 3

The following formulations shown in Table 3 below are prepared:

TABLE 3

| Ingredient | Formula 1 | Formula 2 |
| --- | --- | --- |
| Latex (acrylonitrile) | 100 | 0 |
| Latex (styrene-butadiene) | 0 | 100 |
| Oleic acid (surfactant) | 1 | 2.5 |
| Antioxidant | 0.5 | 1 |
| Phosphate dispersant | 0 | 0.3 |
| Inert filler | 0 | 150 |
| Pigment | 0 | 5 |
| Zinc oxide | 0.5 | 5 |
| Sulfur | 1 | 2.5 |
| Zinc dimethyldithiocarbamate | 0.5 | 0 |
| Zinc diethyldithiocarbamate | 0 | 2.5 |
| Zinc dibutyl dithiocarbamate | 0 | 0 |
| Z(MBT) | 0.5 | 2.5 |
| Ammonia | 0.3 | 2.5 |
| Zinc ammonium chloride | 0.5 | 1.5 |
| Thickening agent | 0.1 | 2.5 |

Each of the foregoing formulations was tested as in Example 1. All three formulations performed in the same manner as those tested in Example 1.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A foamable composition comprising:

a vulcanizable latex rubber dispersion;

an amount of a vulcanizing agent sufficient to vulcanize said latex rubber;

an amount of ammonia sufficient to prevent gellation of said latex rubber;

an amount of a gelling agent sufficient to gel said latex rubber upon removal of a sufficient amount of ammonia from said composition, said gelling agent comprising the reaction product of zinc chloride and an ammonium-containing compound; and an amount of an accelerator sufficient to accelerate vulcanization of said latex rubber, said accelerator comprising a zinc dithiocarbamate.

2. The composition of claim 1, wherein said latex rubber is selected from acrylonitrile, chloroprene, isoprene, butadiene-styrene, butadiene-acrylonitrile, polyacrylonitrile, polyisoprene, polystyrene, polyvinylidene chloride, polyvinyl chloride, polyvinyl acetate, polymethyl methacrylate, co-polymers thereof and copolymers thereof with $C_4$–$C_{10}$ conjugated dienes, and mixtures thereof.

3. The composition of claim 1, wherein said ammonium-containing compound is selected from ammonium hydroxide.

4. The composition of claim 1, wherein said dithiocarbamate compound is selected from zinc dibenzyl dithiocarbamate, sodium dibenzyl dithiocarbamate and mixtures thereof.

5. A foamable composition comprising:

a vulcanizable latex rubber dispersion;

approximately 1–5 parts by weight of a vulcanizing agent;

at least 0.3 parts by weight ammonia;

approximately 0.5–2 parts by weight zinc ammonium chloride; and approximately 0.5–5 parts by weight of a zinc dithiocarbamate.

6. A foamable composition comprising:
a vulcanizable latex rubber dispersion;
approximately 1–5 parts by weight sulfur;
at least 0.3 parts by weight ammonia;
approximately 0.5–2 parts by weight zinc ammonium chloride; and
approximately 0.5–5 parts by weight zinc dibenzyl dithiocarbamate.

7. A method comprising the steps of:
heating a foamable composition for a time sufficient to cause gellation, said composition comprising:
a vulcanizable latex rubber dispersion;
an amount of a vulcanizing agent sufficient to vulcanize said latex rubber;
an amount of ammonia sufficient to prevent gellation of said latex rubber;
an amount of a gelling agent sufficient to gel said latex rubber upon removal of a sufficient amount of ammonia, said gelling agent comprising the reaction product of zinc chloride and an ammonium-containing compound; and
an amount of an accelerator sufficient to accelerate vulcanization of said latex rubber, said accelerator comprising a zinc dithiocarbamate.

8. A method comprising the steps of:
frothing a composition to form a foam, said composition comprising:
a vulcanizable latex rubber dispersion;
an amount of a vulcanizing agent sufficient to vulcanize said latex rubber;
an amount of ammonia sufficient to prevent gellation of said latex rubber;
an amount of a gelling agent sufficient to gel said latex rubber upon removal of a sufficient amount of ammonia, said gelling agent comprising the reaction product of zinc chloride and an ammonium-containing compound; and
an amount of an accelerator sufficient to accelerate vulcanization of said latex rubber, said accelerator comprising zinc dithiocarbamate;
heating said frothed composition for a period of time to cause coagulation of said latex.

9. The method of claim 8 further comprising the steps of:
forming said frothed composition into a layer prior to heating; and
embossing said layer of frothed foam after it has coagulated, but before it has cured.

10. A one-part foamable latex composition which may be stored for extended periods of time prior to foaming, which composition comprises:
a natural or synthetic elastomeric latex subject to cure;
a curing system which comprises an ammonia-retarded dithiocarbamate accelerating agent, which agent is inhibited in accelerating function in the presence of ammonia;
ammonia in an amount sufficient to inhibit the cure of the latex;
a gelling agent comprising zinc ammonium chloride in an amount sufficient to gel the latex upon removal of a sufficient amount of ammonia from said composition; and
a frothing agent in an amount sufficient to permit mechanical frothing of the composition into a foam.

11. A method comprising the steps of:
heating a composition for a time sufficient to cause gellation, said composition comprising:
a natural or synthetic elastomeric latex subject to cure;
a curing system which comprises an ammonia-retarded dibenzyl dithiocarbamate accelerating agent, which agent is inhibited in accelerating function in the presence of ammonia;
ammonia in an amount sufficient to inhibit the cure of the latex;
a gelling agent comprising zinc ammonium chloride in an amount sufficient to gel the latex upon removal of a sufficient amount of ammonia from said composition; and
a frothing agent in an amount sufficient to permit mechanical frothing of the composition into a foam.

12. A method of making an embossed latex foam product comprising:
forming a foam by mechanically frothing a composition comprising:
a natural or synthetic elastomeric latex subject to cure;
a curing system which comprises an ammonia-retarded dithiocarbamate accelerating agent, which agent is inhibited in accelerating function in the presence of ammonia;
ammonia in an amount sufficient to inhibit the cure of the latex;
a gelling agent comprising zinc ammonium chloride in an amount sufficient to gel the latex upon removal of a sufficient amount of ammonia; and
a frothing agent in an amount sufficient to permit mechanical frothing of the composition into a foam;
forming the frothed composition into a layer;
heating the frothed composition for a time sufficient to cause coagulation of said latex; and
embossing said layer of frothed foam after it has coagulated, but before it has cured.

13. The method of claim 12 further comprising heating the frothed and gelled composition for a time sufficient to cure and dry the foam.

* * * * *